United States Patent [19]

Neubert

[11] Patent Number: 4,788,008

[45] Date of Patent: Nov. 29, 1988

[54] FLAME RETARDANT VINYLIDENE CHLORIDE LATEXES AND COATINGS THEREOF

[75] Inventor: Terry C. Neubert, Kent, Ohio

[73] Assignee: GenCorp Inc., Akron, Ohio

[21] Appl. No.: 34,976

[22] Filed: Apr. 6, 1987

[51] Int. Cl.$^4$ .................... C09K 21/00; C09D 5/16; C09D 5/18

[52] U.S. Cl. .................. 252/609; 106/18.14; 106/18.19; 106/18.24; 106/18.28; 106/18.29; 106/18.31; 260/DIG. 24; 524/555; 524/556; 524/568; 524/569; 524/571; 524/573; 526/318.25; 526/318.1; 525/221; 525/231; 525/235; 525/239

[58] Field of Search .............. 252/601, 609, 610; 106/15.05, 18.11, 18.14, 18.24, 18.19, 18.28, 18.29, 18.35, 18.31; 525/224, 235, 225, 239, 226, 231, 223, 224, 218, 213, 212, 209, 193; 526/278, 274, 275, 317.1, 318.25, 318.1, 318.2, 318.3; 260/DIG. 24; 524/555, 556, 568, 569, 571, 573, 562, 458

[56] References Cited

U.S. PATENT DOCUMENTS

| | | | |
|---|---|---|---|
| 3,397,165 | 8/1968 | Goodman et al. | 260/29.7 |
| 3,472,808 | 10/1969 | Isgur | 260/29.7 |
| 3,903,037 | 9/1975 | Deets | 260/DIG. 24 |
| 3,948,842 | 4/1976 | Kraft et al. | 526/275 |
| 3,991,134 | 11/1976 | Kraft et al. | 526/278 |
| 3,992,337 | 11/1976 | Kraft et al. | 526/278 |
| 3,992,481 | 11/1976 | Kraft et al. | 526/278 |
| 3,992,482 | 11/1976 | Kraft et al. | 525/193 |
| 4,014,836 | 3/1977 | Kraft et al. | 526/274 |
| 4,014,837 | 3/1977 | Kraft et al. | 526/274 |
| 4,014,838 | 3/1977 | Kraft et al. | 526/274 |
| 4,014,839 | 3/1977 | Kraft et al. | 526/274 |
| 4,022,849 | 5/1977 | Jin et al. | 524/533 |
| 4,049,747 | 9/1977 | Jin et al. | 525/231 |
| 4,079,028 | 3/1978 | Emmons et al. | 525/76 |
| 4,191,685 | 3/1980 | Haaf et al. | 525/394 |
| 4,205,153 | 5/1980 | Weinstein | 526/292 |
| 4,206,290 | 6/1980 | Yusa et al. | 525/231 |
| 4,415,704 | 11/1983 | Weinstein | 525/76 |

*Primary Examiner*—Stephen J. Lechert, Jr.
*Assistant Examiner*—Howard J. Locker

[57] ABSTRACT

A latex copolymer composition is produced having good flame retardancy. The copolymer is typically made from vinylidene chloride monomers, conjugated diene monomers, vinyl substituted aromatic monomers, and functional monomers such as unsaturated mono or dicarboxylic acids. Through the use of flame retardant agents such as halogenated waxes, metallic salts, and the like, the pliability or softness, as well as the strength of the copolymer composition, can be controlled. Flexibilizing agents can optionally be utilized to abate cracking, especially after heat aging. The composition can optionally be pigmented. The flame retardant latex composition can be utilized as coatings on various substrates such as mats, fibers, and the like.

11 Claims, No Drawings

FLAME RETARDANT VINYLIDENE CHLORIDE LATEXES AND COATINGS THEREOF

FIELD OF THE INVENTION

The present invention relates to flame retardant latex copolymers and coatings thereof made in part from vinylidene chloride monomers. More specifically, the present invention relates to compositions of latex copolymers containing compatible flame retardants therein and optionally containing pigments and/or flexibilizing agents therein.

BACKGROUND

Heretofore, it was generally not known to produce flame retardant vinylidene chloride containing latex copolymer compositions.

U.S. Pat. No. 3,397,165 to Goodman, et al, relates to the preparation of latexes from seed particles. The monomers generally include butadiene, styrene, vinylidene chloride and, an acid such as methacrylic acid.

U.S. Pat. No. 3,472,808 to Isgur relates to diene copolymers made from conjugated dienes, styrene, vinylidene chloride, and a functional monomer, as for example acrylamide. The emulsion polymerization process involves charging a relatively small quantity of polymer latex as a seed to provide nucleating sites for polymerization and adding the monomers at a controlled rate.

SUMMARY OF THE INVENTION

It is therefore an aspect of the present invention to provide a flame retardant latex copolymer composition containing a copolymer having vinylidene chloride groups therein.

It is another aspect of the present invention to provide a flame retardant latex copolymer composition wherein flame retardant agents are utilized which achieve a desired or tailor-made softness, that is pliability, and flame spreading rate.

It is a further aspect of the present invention to provide a flame retardant latex copolymer composition, as above, wherein the composition contains a latex copolymer as well as flame retardant agents, and wherein said composition can be applied, as by coating, spraying, or dipping, to various mats, for example fiberglass mats as utilized in duct liners, automotive hood pads, and the like.

It is yet another aspect of the present invention to provide a flame retardant latex copolymer composition having good cracking resistance upon heating aging.

These and other aspects of the present invention will become apparent from the following detailed specification.

In general, a carboxylated vinylidene chloride tape latex copolymer and flame retardant composition comprises a latex copolymer, said latex copolymer made from monomers including vinylidene chloride, and the composition containing an effective amount of at least one compatible flame retardant agent.

DETAILED DESCRIPTION OF THE INVENTION

According to the present invention, a latex copolymer containing vinylidene chloride units therein is utilized in association with flame retardants to form a latex copolymer flame retardant composition. Various substrates can be coated with the compositions of the present invention. The latex copolymers of the present invention are generally made from conjugated diene monomers, vinyl substituted aromatic monomers, vinylidene chloride monomers, and functional monomers. Considering the conjugated diene monomers, they generally have from 4 to 8 carbon atoms with from 4 to 6 carbon atoms being desired. Butadiene is preferred. Examples of specific diene monomers include isoprene, piperylene, 2,3-dimethyl-1, 3-butadiene, pentadiene, hexadiene, and the like with 1,3-butadiene being preferred. Mixtures of various conjugated dienes can also be utilized. That is, one or more different types of the conjugated diene monomers can be utilized in the present invention. The amount of the conjugated diene monomer utilized to make the latex copolymer is generally from about 10% to about 80% by weight with from about 35% to about 65% parts by weight being preferred based upon the total by weight of all of the monomers forming the latex copolymer.

The vinyl substituted aromatic monomers utilized in forming the latex copolymer of the present invention generally have from about 8 to about 12 total carbon atoms, and preferably from about 8 to about 10 carbon atoms. Specific examples of such monomers include alpha methyl styrene, para methyl styrene, paratertiary butyl styrene, methyl vinyl toluene, p-vinyl toluene, 3-ethyl styrene, and the like with styrene being preferred. In lieu of a single vinyl substituted aromatic type monomer, a plurality of such monomers can be utilized. The amount of the styrene can vary from about 1% to abuot 60% by weight, and preferably from about 3% to about 30% by weight.

The amount of vinylidene chloride utilized is generally from about 20% to about 80% by weight, and preferably from about 30% to about 60% by weight based upon the total weight of the latex copolymer forming monomers.

Functional monomers are utilized to carboxylate the copolymer and result in increased latex stability, higher tensile strength of the polymer and provide active sites for further chemical reactions, if desired. The functional monomers include the acrylamide and methacrylamide type monomers, the vinyl ethers, and the unsaturated mono- and dicarboxylic acids.

Considering the unsaturated monocarboxylic acids and the unsaturated dicarboxylic acids, they generally have a total of from about 3 to about 8 carbon atoms, desirably from about 3 to about 6 carbon atoms, and preferably from about 3 to about 5 carbon atoms. Examples of monocarboxylic acids include acrylic acid and methacrylic acid. Examples of dicarboxylic acids include fumaric acid, maleic acid, itaconic acid, and the like. Itaconic acid is preferred. The amount of such acid is generally small, as from about 0.5 to about 10% by weight and desirably from about 1.5% to about 4.0% by weight based upon the total weight of the copolymer forming monomers.

The acrylamides and the methacrylamides include various alkyl derivatives thereof having from 1 to 2 carbon atoms attached to either the nitrogen atom and/or the vinyl group with specific examples including dimethylacrylamide, methylene bisacrylamide, and the like.

The vinyl ethers are another class of functional monomers which can be utilized in the present invention. They are generaly represented by the formula

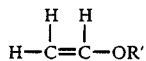

wherein;

R' is an alkyl group having from 1 to 6 carbon atoms, or a substituted chloroalkyl group having a total of from 1 to 6 carbon atoms. Examples of such specific vinyl ethers include n-butyl vinyl ether, vinyl chloroethyl ethyl, and the like.

The copolymer forming monomers of the present invention can be reacted according to any conventional free-radical aqueous polymerization method known to the art as well as to the literature. Moreover, if desired, other types of polymerization, for example anionic, methods can be utilized.

Various one or more conventional flame retardant agents are utilized in association with the above latex copolymer of the present invention and hence the use of any single agent is generally optional. An important aspect of the use of various flame retardant agents is that they be compatible with the latex copolymer. By the term "compatible", it is meant that the flame retardant agents can be mixed with the latex without causing separation or coagulation. That is, the flame retardants are generally maintained in suspension in the aqueous latex.

Generally, any compatible flame retardant can be utilized as known to the art and to the literature. For example, many suitable flame retardant plasticizers and fillers are listed in Chapter 5, "Available Flame Retardants", of the "Flammability Handbook For Plastics", second edition, Technamic Publishing Co., Inc., 1974, by Carlos J. Hilado, and the same is fully incorporated by reference. Of the numerous types of compatible flame retardants which can be utilized, more desired types include the various halogenated waxes such as paraffin waves, various halogenated phosphates such as brominated phosphates, various metallic hydrates such as aluminum trihydrate, various metal oxides such as antimony oxide, and the like. Generally, the halogenated waxes and the metallic hydrates are preferred.

Considering the halogenated waxes, they are generally a preferred flame retardant, and desirably are chlorinated or brominated paraffin waxes. Preferably, only the non-carcinogenic waxes are utilized in the present invention. By the term "waxes", it is to be understood that the actual wax can be a liquid, e.g. an oil or solid. Suitable halogenated paraffin waxes (solid or liquid) which are utilized in the present invention generally have a molecular weight of from about 200 to about 2,000, desirably from about 400 to about 1,100, and preferably from about 560 to about 660. Examples of a suitable halogen wax include Chlorowax 50 and Chlorowax 40 which are produced by the Dow Chemical Company and have a molecular weight of about 660 and 560 respectively. The halogenated waxes, in addition to imparting flame retardancy to the latex copolymer composition act as a plasticizer. Hence, larger amounts can be utilized to produce a latex copolymer composition having a reduced strength but being softer and hence more pliable. The amount of the halogenated waxes, when utilized, can vary over a wide range from about 5 to about 150 parts by weight, desirably from about 20 to about 100 parts by weight, and preferably from about 25 to about 75 parts by weight based upon 100 parts by weight of the dried latex copolymer. The halogenated waxes generally exist in a liquid form and, hence, can be readily emulsified and added to the latex copolymer solution.

The metallic hydrates form a preferred flame retardant agent of the present invention inasmuch as they provide good flame retardancy, act as a filler, and are generally inexpensive. Examples of various types of metallic hydrates include modified barium metaborate monohydrate (Busan 11-M1, manufactured by Buckman Laboratories, Inc.) and aluminum trihydrate, with aluminum trihydrate being preferred. Inasmuch as the metallic hydrates are solid, when utilized in large amounts, they generally yield a hard or plastic composition. Hence, they need not be utilized if a soft or pliable plastic is preferred. The amount of the metal hydrate, when utilized, can also vary over a very wide range as from about 10 to about 500 parts by weight and preferably from about 80 to about 300 parts by weight based upon 100 parts by weight of the dried latex copolymer.

Other solid flame retardant agents are the various metal oxides such as antiomony oxide which can also be utilized as a filler. Naturally, the types of metal oxides utilized are low in the various contaminates. The amount of metal oxide such as antimony oxide, when utilized, is generally from about 5 to about 300 parts and preferably from about 5 to 100 parts by weight based upon 100 parts by weight of the dried latex copolymer.

The halogenated phosphates also act as plasticizer but are generally not as effective a plasticizer as the halogenated waxes. Of the various halogenated phosphates, the brominated phosphates are preferred. The amount of the halogenated phosphates, when utilized, are generally from about 5 to about 150 parts by weight with from about 15 to about 50 parts by weight being preferred based upon 100 parts by weight of the dried latex copolymer.

The blend of the latex copolymer and the various compatible flame retardants generally form the latex copolymer flame retardant composition of the present invention. When blended, a rubbery type polymer is produced containing the flame retardants therein. Such compositions have notably increased flame retardancy. Generally, char length values of 5 inches or less, desirably 2 inches or less, are obtained based upon NFPA 701 Small-Scale Flame Test.

An optional ingredient or component of the latex copolymer composition of the present invention is the utilization of one or more pigments. Generally, the pigments in addition to imparting color act as a filler and often can lower the cost of the copolymer composition. Since the pigments are generally not as effective as various flame retardants, when good flame retardancy is desired they are generally not utilized. Various types of conventional pigments can be utilized as well as those known to the art and to the literature. Typical examples include various clays such as the kaolin clays, calcium carbonate, carbon black, and the like. The amount of the pigments can vary over a wide range as from about 1 to about 500 parts by weight and desirably from about 5 or 10 to about 100 to 200 parts by weight, based upon 100 parts by weight of the dried copolymer.

In addition to the above components of the flame retardant latex copolymer composition, conventional emulsion additives can be utilized. Such emulsion polymerization additives include various emulsifiers, various chain transfer agents or extenders which act as molecular weight modifiers, various free-radical initiators, various chelating agents, various shortstops, electrolytes, various antioxidants, various thickeners, and the like. Considering the emulsifiers, they can be any compound known to the art as well as to the literature such as soaps, surfactants, dispersing agents, and the like. The surfactants as well as the other emulsifiers can be cationic, anionic, or mixtures thereof with nonionics. Examples of specific emulsifiers include the various alkyl sulfates, the various alkyl sulfosuccinates, the various alkyl aryl sulfonates, the various alpha olefin sulfonates, the various quarternary ammonium salts, the various amine salts, the various fatty or rosin acid salts, nonyl or octyl phenol reaction products of ethylene oxide and the like. The alkyl portion of the various emulsifiers generally has from 8 to 18 carbon atoms. Naturally, an amount of an emulsifier is utilized to obtain an aqueous emulsion of the various monomers. Generally, such an amount is typically from about 0.1 to about 5 or 6 parts by weight for every 100 parts by weight of the monomers. Other surfactants can be utilized such as those set forth in "Surface Active Agents," Schwartz and Perry, Vol I, Interscience Publishers, Inc., New York, 1958; "Surface Activity," Moilliet, Collie and Black, D. Van Nostrand Company, Inc., New York, 1961; "Organic Chemistry," Fieser and Fieser, D.C. Heath and Company, Boston, 1944; and "The Merck Index," Seventh Edition, Merck & Co., Inc., Rahway, N.J., 1960, and McCutcheon's Emulsifiers and Detergents, North American Edition, 1986, MC Publishing Co., Glen Rock, N.J., all of which are hereby fully incorporated by reference.

The various chain extenders or molecular weight regulators can be conventional compounds as well as those known to the art and to the literature. Accordingly, compounds such as carbon tetrabromide, bromotrichloromethane, and carbon tetrachloride can be utilized. However, mercaptans such as the alkyl and/or aralkyl mercaptans having from 8 to about 18 carbon atoms and preferably from about 12 to about 14 carbon atoms are preferably utilized. The tertiary alkyl mercaptans having from 12 to 14 carbon atoms are highly preferred. Examples of suitable mercaptans include n-octyl mercaptan, n-dodecyl mercaptan, t-octylmercaptan, t-dodecyl mercaptan, p-tridecyl mercaptan, tetradecyl mercaptan, hexadecyl mercaptan, and the like, as well as mixtures thereof. The amount of the molecular weight modifiers is an effective amount to provide for the desired molecular weight and tensile strength of the interpolymer, for example from about 0.1 to about 5.0 parts by weight and desirably from about 0.2 to about 1.0 parts by weight for every 100 parts by weight of the monomers.

Free-radial initiators are utilized to polymerize the various monomers and are utilized in amounts sufficient to obtain a desired polymerization rate. A suitable amount is generally from about 0.1 to about 2.0 with from about 0.2 to about 1.0 parts being preferred for every 10 parts by weight of the monomers. Conventional free-radical initiators can be utilized as well as those known to the art and to the literature. Specific examples include ammonium persulfate, potassium persulfate, and/or sodium persulfate, hydrogen peroxide, and the like. Other free-radical initiators can be utilized which decompose or become active at the temperature utilized during polymerization. Examples of other free-radical catalysts include cumene hydroperoxide, dibenzoyl peroxide, diacetyl peroxide, dodecanoyl peroxide, di-t-butyl peroxide, dilauroyl peroxide, bis(p-methoxy benzoyl) peroxide, t-butyl peroxy pivalate, dicumyl peroxide, isopropyl percarbonate, di-sec-butyl peroxidicarbonate, azobisdimethylvaleronitrile, 2,2'-azobisisobutyronitrile, 2,2'azobis-2-methyl-butyronitrile, 2,2'azobis (methylisobutyrate) and the like and mixtures thereof. It is preferred to use the inorganic persulfates of which the sodium salt is preferred since they impart better color to the resulting polymer when dried. Organic hydroperoxides such as t-butyl hydroperoxides are preferred for the cationic system of the present invention.

Chelating agents can be utilized during polymerization to tie up various metal impurities as well as to achieve a uniform polymerization. The amounts of such chelating agents are generally small such as from about 0.01 to about 0.25 parts by weight for every 100 parts by weight of the monomers. Examples of suitable chelating agents include ethylene diamine tetraacetic acid, nitrilotriacetic acid, citric acid, and their ammonium, potassium, and sodium salts.

Various shortstop compounds can also be utilized. Not only do the shortstop compounds terminate the polymerization in the reactor at desired conversion levels, but also prevent further polymerization, cross-linking, etc., during stripping, or during other processing steps. Examples of suitable shortstop agents include hydroquinone, sodium sulfide, hydroxyl ammonium acid sulfate, hydroxyl ammonium sulfate, sodium diethyl dithiocarbamate, diethylhydroxylamine, sodium dimethyl dithiocarbamate, potassium dimethyl dithiocarbamate, dimethylammonium dimethyldithiocarbamate, hydroxylamine sulfate, sodium hydrosulfite, and the like. The amount of shortstop utilized is from about 0.05 to about 0.25 parts by weight for every 100 parts by weight of said monomers. Of course, other conventional chelating agents as well as shortstops can be utilized including those known to the art and to the literature.

The electrolytes can be alkaline or neutral such as various carbonate, various bicarbonates, various sulfates, and various monobasic salts thereof. These and other electrolytes are known to the art as well as to the literature. The amount of such electrolytes can generally be from about 0.1 to about 1 part by weight for every 100 parts by weight of said monomers.

Numerous antioxidants exist and can be utilized in the present invention in amounts of from about 0.1 to about 3.0 parts by weight for every 100 parts by weight of said monomers. Examples of suitable antioxidants include hindered phenols or various types of diamines. Additionally, various conventional thickeners as well as those known to the art and to the literature can be utilized, generally in amounts of from about 0.05 to about 1.0 parts by weight for every 100 parts by weight of said monomers. Examples of suitable thickeners include various types of polyacrylic acid or polyvinyl alcohol.

Polymerization of the various monomers is carried out at a temperature sufficient to activate the initiators. However, extremely high temperatures are avoided since they can cause a run-away reaction. Too low temperatures are not desired since they may not activate the initiator. Suitable polymerization temperatures are from about 2° C. to about 90° C., desirably from about 35° C. to about 80° C., and preferably from about 65° C. to about 80° C. Polymerization time will naturally vary depending upon the type of monomers utilized, the type of initiator utilized, and the degree of polymerization desired. Hence, typical polymerization times can range from about 5 to about 35 hours. Polymerization is generally carried out to completion and conducted in an acidic medium when acidic monomers are utilized. Upon completion of the reaction or the desired degree of polymerization, optional bases can be added to neutralize the latex. Examples of such optional bases include NaOH, KOH, NH$_4$OH, and the like.

The free radical polymerization can be carried out according to any conventional method including batch, incremental, as previously noted, or continuous. The water used during the polymerization should be free of deleterious material and hence is often distilled or ion exchanged water. The amount of water used is sufficient to enable the formation of an emulsion and to enable proper mixing of the various ingredients as well as to obtain the desired rate and degree of polymerization, heat transfer, and the like. Upon completion of polymerization, the amount of copolymer or solid latex content can vary from about 10% to about 60% by weight and preferably from about 40% to about 55% by weight.

Desirably, polymerization is conducted in an inert atmosphere such as nitrogen, helium, argon, and the like and hence it is carried out in a closed reactor. The reactor can be any conventional reactor and thus have suitable ports, agitation means, heating and cooling means, and the like. In accordance with conventional practice, the reactors utilized are generally cleaned as by flushing with water between polymerizations to remove traces of various initiators, shortstops, residues, surfactants, and the like.

The copolymer latexes of the present invention can be treated with other conventional aditives such as antioxidants, biocides, defoamers, and the like as known to the art and to the literature.

An important aspect of the present invention is the utilization of flexibilizing agents to maintain a pliable copolymer composition. That is, it has been found that flexibilizing agents maintain a soft and yet strong composition in that cracking, especially after heat aging, is substantially reduced. Suitable flexibilizing agents include ionic bonding agents, that is compounds which form a strong ionic bond to the carboxyl groups of the copolymer. Suitable bonding agents include the various amine compounds, such as primary amines, desirably secondary amines, and preferably tertiary amines, as well as various polyamines. The amines can be aliphatic, cycloaliphatic, aromatic, or the like. Examples of primary amines include ethylamine, n-butylamine, allylamine, stearylamine, dodecylamine, and the like. Generally, the primary amines include ammonia and thus contain from 0 to about 30 carbon atoms, with from about 0 to about 12 carbon atoms being preferred. Examples of cycloaliphatic primary amines include cyclohexylamines, cyclopentylamines, dicyclophexylamines, and the like. Examples of aromatic amines include aniline, naphthylamine, and the like. Examples of secondary amines include diethylamines, dibutylamine, diallylamine, and the like. The secondary amines generally contain from 1 to 30 carbon atoms and preferably from 2 to 12 carbon atoms.

Examples of tertiary amines include triethylamine, tributylamine, trialkylamine, and the like. The number of carbon atoms in the tertiary amine generally range from about 2 to about 30, with from about 2 to about 12 being preferred.

Various polyamines can be utilized and include compounds such as tetraethylene pentamine, etc., as well as polymeric amines. The number of carbon atoms in the polyamines can vary greatly and are known to the art as well as to the literature.

In addition to the various types of amines, alcohol amines can be utilized such as ethanolamine, 2-amino-2-methyl-1-propanol, diethylhydroxylamine, and the like. The number of carbon atoms in such alcohol amines is from about 2 to about 30, with from about 2 to about 12 being preferred. Regardless of the various types of ionic bonding agents such as the amines or alcohol amines utilized, the amount thereof is generally from aboug 0.1 to about 10 parts, desirably from about 1 to about 6 parts, and preferably from about 2 to about 4 parts by weight based upon 100 parts by weight of the latex copolymer.

The preparation of the flame retardant latex copolymer compositions of the present invention is rather straight forward. Generally, the copolymer-latex, that is the latex made from the conjugated diene, vinyl substituted aromatic, carboxylic acid, and vinylidene chloride monomers, is added to a vessel. The various liquid additives are then added such as the flexibilizing agents, any liquid flame retardant such as the halogenated waxes, the various optional dispersants, and various antioxidants. These compounds are then blended or mixed. To this blend is added various solid compounds such as solid flame retardants, for example the metallic hydrates, various pigments, and various thickeners. These compounds are blended or mixed with the liquid mixture to disperse and/or dissolve the same. The formed latex flame retardant copolymer composition is then applied to generally coat a suitable substrate and dried in any conventional manner as through the application of heat, for example an oven, infrared radiation, and the like.

The flame retardant latex coploymer compositions of the present invention can be utilized in numerous applications wherever good flame retardancy is required. Specific suitable examples include utilization as a coating material for heating duct liners, hood pads for automobiles, and the like. Inasmuch as the flame retardant latex compositions of the present invention form a rubbery material or composition generally having good strength, they can also be utilized to bond various glass fibers together in the form of a mat and to maintain the same in a predetermined arrangement. Synthetic organic fibers such as rayon, nylon, polyester, etc. can also be bonded or coated with the flame retardant compositions of the present invention.

The present invention will be better understood by reference to the following examples.

In general, the flame test utilized in the present invention is NFPA-701-6,7 (small scale). Inasmuch as this test is well known, it is hereby fully incorporated by reference.

EXAMPLE I

Various flame retardant latex copolymer compositions are made in accordance with the formulation set forth in Table I.

TABLE I

|  | Control | Film 1 Points | Film 2 Points | Film 3 Points |
| --- | --- | --- | --- | --- |
| GEN FLO 7103, a Carboxylated SBR containing 61 parts by weight styrene | 100 | — | — | — |
| PYROGEN 8519, a carboxylated styrene/ butadiene/vinylidene | — | 100 | 100 | 100 |

TABLE I-continued

|  | Control | Film 1 Points | Film 2 Points | Film 3 Points |
|---|---|---|---|---|
| chloride rubber containing 60 parts by wt. vinylidene chloride |  |  |  |  |
| Tamol N, a dispersant, manufactured by Rohm and Haas Co. | 5 | 5 | 5 | 5 |
| Aquamix 351, a chlorinated paraffin emulsion, manufactured by Harwick Chemical Corp. | 60 | 60 | 60 | 60 |
| Aquamix 102, a diamine type antioxidant emulsion, manufactured by Harwick Chem. Corp. | 1.0 | 1.0 | 1.0 | 1.0 |
| AMP 95, 2-amino-2-methyl-1-propanol, manufactured by Angus Chemical Company | 3.0 | 3.0 | 3.0 | 3.0 |
| Aluminum Trihydrate | 150 | 200 | 150 | 100 |
| Magnesium Hydroxide | 15 | 15 | 15 | 15 |
| Carbon Black Dispersion | 10.6 | 15 | 10.6 | 8.1 |
| Paragum 141, a polyacrylic acid type thickener, manufactured by Para-Chem Southern Inc. | 3.8 | 3.8 | 3.8 | 3.8 |

The above formulations were prepared by adding the copolymer latex to a vessel. The various liquid components such as the dispersant, the chlorowax, the antioxidant and the flexibilizer were added thereto and mixed, then all the remaining solid ingredients were added and mixed. The composition was applied to a fiberglass mat by spraying or by roll coating and the mat was dried in an air over at 300° F.

In accordance with the above-described flame test, the various films were tested with regard to flame retardancy. The test results were as follows.

FILM 1

| SPECIMEN NO. | AFTER FLAME SECS. | DRIP BURN SECS. | CHAR INCHES |
|---|---|---|---|
| 1 | 0 | 0 | 1.1 |
| 2 | 0 | 0 | 1.0 |
| 3 | 0 | 0 | 1.6 |
| 4 | 0 | 0 | 1.8 |
| 5 | 0 | 0 | 1.2 |
| 6 | 0 | 0 | 1.5 |
| 7 | 0 | 0 | 1.8 |
| 8 | 0 | 0 | 0.8 |
| 9 | 0 | 0 | 1.3 |
| 10 | 0 | 0 | 1.7 |
| AVERAGE |  |  | 1.4 |

In a similar manner, Film 2 was tested and gave the following results:

FILM 2

| SPECIMEN NO. | AFTER FLAME SECS. | DRIP BURN SECS. | CHAR INCHES |
|---|---|---|---|
| 1 | 0 | 0 | 1.1 |
| 2 | 0 | 0 | 0.7 |
| 3 | 2 | 0 | 0.8 |
| 4 | 2 | 0 | 1.2 |
| 5 | 0 | 0 | 1.1 |
| 6 | 0 | 0 | 1.4 |
| 7 | 0 | 0 | 1.4 |
| 8 | 0 | 0 | 0.8 |
| 9 | 0 | 0 | 0.6 |
| 10 | 0 | 0 | 0.7 |
| AVERAGE |  |  | 1.0 |

In a similar manner to Example I, Film 3 was tested and yielded the following results:

FILM 3

| SPECIMEN NO. | AFTER FLAME SECS. | DRIP BURN SECS. | CHAR INCHES |
|---|---|---|---|
| 1 | 0 | 0 | 0.6 |
| 2 | 2 | 0 | 1.5 |
| 3 | 0 | 0 | 1.5 |
| 4 | 0 | 0 | 0.9 |
| 5 | 0 | 0 | 1.2 |
| 6 | 0 | 0 | 1.2 |
| 7 | 0 | 0 | 0.7 |
| 8 | 0 | 0 | 1.2 |
| 9 | 0 | 0 | 0.8 |
| 10 | 0 | 0 | 1.0 |
| AVERAGE |  |  | 1.1 |

The control was then tested and yielded the following results:

CONTROL USING CARBOXYLATED SBR

| SPECIMEN NO. | AFTER FLAME SECS. | DRIP BURN SECS. | CHAR INCHES |
|---|---|---|---|
| 1 | (62) | 0 | (10.0) |
| 2 | (65) | 0 | (10.0) |
| 3 | (57) | 0 | (10.0) |
| 4 | (83) | 0 | (10.0) |

As readily apparent from the above date, the control yielded a char length of approximately 10 inches during the test. In contrast thereto, the various flame retardant latex copolymer compositions of the present invention achieve remarkably low flame test results, that is char lengths of 1.4, 1.0, and 1.1 inches on the average. Such results clearly demonstrate the improvement of the flame retardant copolymer compositions of the present invention.

EXAMPLE II

In a manner similar to Example I utilizing an identical formulation except for a different compound, that is AMP 95, a glass mat was coated with the copolymer composition. Strips of the material from 1 to 3 inches by 22 inches were then cut and placed in an oven for 60 seconds at 475° F. The strips were removed from the oven cooled and then rolled and put into cups. After 5 minutes, these strips were carefully unrolled and any cracks marked. The strips were then placed in a 475° F. oven for 3 minutes. Once again they were removed from the oven, cooled and then rolled and put into a cup. After 5 minutes, they were carefully unrolled and marked with regard to any cracks.

The amount of amine compound, that is AMP 95, 2-amino-2-methyl-1-propanol, is as follows:

The control did not contain any AMP 95. Example 2A contained 2.5 parts thereof, and Example 2B contained 10.0 parts thereof. The results of the roll test are as follows:

CRACK RATING (0=NONE, 3=VERY BAD)

| SAMPLE | 1 MINUTE | 4 MINUTES |
| --- | --- | --- |
| Control | 1 (slight cracking) | 1 (slight cracking) |
| Example 2A | 0 | 0 |
| Example 2B | 0 | 0 |

As apparant from the above test results, the samples containing 2.5 parts and 10 parts by weight of the amine containing compound did not crack.

While in accordance with the patent statutes, a best mode and preferred embodiment has been set forth in detail, the scope of the invention is not limited thereto, but rather by the scope of the attached claims.

What is claimed is:

1. A flame retardant latex copolymer composition, comprising;
a latex copolymer, said latex copolymer made from a conjugated diene monomer having from 4 to 8 carbon atoms, a vinyl substituted aromatic monomer having from 8 to 12 carbon atoms, at least one functional monomer, and a vinylidene chloride monomer, the composition containing an effective amount of at least one compatible flame retardant agent so that a char length of 5 inches or less is obtained according to NFPA 701 Small Scale Flammability Test, said compatible flame retardant agent being a halogenated wax, a halogenated phosphate, a metallic hydrate, a metal oxide, or combinations thereof, and from about 0.1 to about 10 parts by weight per 100 parts by weight of said latex copolymer of a flexibilizing agent, said flexibilizing agent being a primary amine, a secondary amine, a tertiary amine, a polyamine, or an amine alccohol.

2. A flame retardant latex copolymer composition according to claim 1, wherein the amount of said conjugated diene is from about 10% to about 80% by weight based upon the weight of all monomers forming said latex copolymer, wherein the amount of said vinyl substituted aromatic monomer is from about 1% to about 60% by weight based upon the weight of all monomers forming said latex copolymer, wherein the amount of said functional monomer is from about 0.5% to about 10% by weight based upon the weight of all monomers forming said latex copolymer, wherein said functional monomer is an acrylamide, a methacrylamide, or alkyl derivatives thereof having from 1 to 2 carbon atoms attached to the nitrogen atom or to the vinyl group; a vinyl ether having the formula

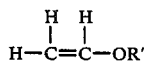

wherein R' is an alkyl group having from 1 to 6 carbon atoms, or a substituted chloroalkyl group having from 1 to 6 carbon atoms; or an unsaturated monocarboxylic acid or an unsaturated dicarboxylic acid having a total of from 3 to 8 carbon atoms, and wherein the amount of said vinylidene chloride monomer is from about 20% to about 80% by weight based upon the weight of all monomers forming said latex copolymer.

3. A flame retardant latex copolymer composition according to claim 2, wherein said conjugated diene is butadiene, wherein the amount of said butadiene is from about 35% to about 65% by weight, wherein said vinyl substituted aromatic monomer is styrene, paramethyl styrene, or alphamethyl styrene, wherein the amount of said styrene, alphamethyl styrene, or paramethyl styrene is from about 3% to about 30% by weight, wherein said functional monomer acid monomer is itaconic acid, fumaric acid, acrylic acid, or methacrylic acid, wherein the amount of said acid is from about 1.5% to aboug 4.0% by weight and wherein the amount of said vinylidene chloride monomer is from about 30% to about 60% by weight.

4. A flame retardant latex copolymer composition according to claim 2, wherein said halogenated wax has a molecular weight of from about 200 to about 2,000, wherein the amount of said halogenated wax is from about 5 parts to about 150 parts by weight per 100 parts by weight of said latex copolymer, wherein the amount of said metal hydrate is from about 10 to about 500 parts by weight per 100 parts by weight of said latex copolymer, wherein said metal oxide is antimony oxide, wherein the amount of said antimony oxide is from about 5 parts to about 300 parts by weight per 100 parts by weight of said latex copolymer, and wherein the amount of said halogenated phosphate is from about 5 parts to about 150 parts by weight per 100 parts by weight of said latex copolymer.

5. A flame retardant latex copolymer composition according to claim 3, wherein said flame retardant agent is a halogenated wax or a metallic hydrate, wherein said metalli chydrate is aluminum trihydrate or barium metaborate monohydrate or combinations thereof, wherein said halogenated wax is a chorinated or a brominated paraffin wax having a molecular weight of from about 400 to about 1,100, wherein the amount of said chlorinated or brominated paraffin wax is from about 25 parts to about 75 parts by weight per 10 parts by weight of said latex copolymer, wherein the amount of said aluminum trihydrate or said barium metaborate monohydrate is from about 80 parts to about 300 parts by weight per 100 parts by weight of said latex copolymer, wherein the amount of said amine flexibilizing agent is from about 1 to about 6 parts by weight per 100 parts of said latex copolymer and wherein said amine flexibilizing agent is said tertiary amine or said amine alcohol.

6. A flame retardant latex copolymer composition according to claim 3, wherein said flame retardant agent is a halogenated wax or a metallic hydrate, wherein said metallic hydrate is aluminum trihydrate or barium metaborate monohydrate or combinations thereof, wherein said halogenated wax is a chlorinated or a brominated paraffin wax having a molecular weight of from about 400 to about 1,100 wherein the amount of said chlorinated or brominated paraffin wax is from about 25 parts to about 75 parts by weight per 100 parts by weight of said latex copolymer, wherein the amount of said aluminum trihydrate or said barium metaborate monohydrate is from about 80 parts to about 300 parts by weight per 10 parts by weight of said latex copolymer, and wherein said amine flexibilizing agent is 2-amino-2-methyl-1-propanol.

7. A flame retardant carboxylated vinylidene chloride type latex copolymer coating composition, comprising: a carboxylated vinylidene chloride latex copolymer, at least one flame retardant agent, and from about 0.1 to about 10 parts by weight per 100 parts by weight of said latex copolymer of an amine flexibilizing agent, said latex copolymer made from latex forming monomers containing from about 20% to about 80% by weight per 100 parts by weight of the total latex forming monomers of a vinylidene chloride monomer, from about 10% to about 80% by weight based upon the weight of all monomers forming said latex copolymer of a conjugated diene monomer having from 4 to 8 carbon atoms, from about 1% to about 60% by weight based upon the weight of all monomers forming said latex copolymer of a vinyl substituted aromatic monomer having from about 8 to about 12 carbon atoms, and from about 0.5% to about 10% by weight based upon the weight of all monomers forming said latex copolymer of a functional monomer, wherein said functional monomer is an acrylamide, a methacrylamide, or alkyl derivatives thereof having from 1 to 2 carbon atoms attached to the nitrogen atom or to the vinyl group, a vinyl ether having the formula

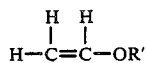

wherein R' is an alkyl group having from 1 to 6 carbon atoms, or a substituted chloroalkyl group having from 1 to 6 carbon atoms; or an unsaturated monocarboxylic acid or an unsaturated dicarboxylic acid having a total of from 3 to 8 carbon atoms, wherein the amount of said flame retardant agent is from about 5 to about 150 parts by weight per 100 parts by weight of said latex copolymer of a halogenated paraffin wax having a molecular weight of from about 200 to about 2,000, optionally from about 5 to about 150 parts by weight per 100 parts by weight of said latex copolymer of a halogenated phosphate, optionally from about 10 parts by weight to about 500 parts by weight per 100 parts by weight of a metallic hydrate, optionally from about 5 to about 300 parts by weight per 100 parts by weight of said latex copolymer of a metal oxide, and wherein said amine flexibilizing agent is a primary amine having from 0 to 30 carbon atoms, a secondary amine having from 1 to 30 carbon atoms, a tertiary amine having from 2 to 30 carbon atoms, a polyamine, or an amine alcohol having from 2 to 30 carbon atoms.

8. A coating composition according to claim 7, wherein said halogenated paraffin wax is a chlorinated or a brominated paraffin wax having a molecular weight of from about 400 to about 1,100, wherein the amount of said chlorinated or brominated paraffin wax is from about 20 to about 100 parts by weight per 100 parts by weight of said latex copolymer, wherein said halogenated phosphate is a brominated phosphate, wherein the amount of said brominated phosphate is from about 15 to about 50 parts by weight per 100 parts by weight of said latex copolymer, wherein said metal hydrate is aluminum trihydrate, wherein the amount of said aluminum hydrate is from about 80 to about 300 parts by weight per 100 parts by weight of said latex copolymer, wherein said metal oxide is antimony oxide, and wherein the amount of said antimony oxide is from about 5 to about 100 parts by weight per 100 parts by weight of said latex copolymer.

9. A coating composition according to claim 7, wherein said composition has a char length of 5 inches or less according to test NFPA 701 Small Scale Flammability Test, wherein the amount of said amine flexibilizing agent is from about 1 to about 6 parts by weight per 100 parts by weight of said latex copolymer, and wherein said amine flexibilizing agent is said tertiary amine or said amine alcohol.

10. A coating composition according to claim 8, wherein said conjugated diene is butadiene, wherein the amount of said butadiene is from about 35% to about 65% by weight, wherein said vinyl substituted aromatic monomer is styrene, alphamethyl styrene, or paramethyl styrene, wherein the amount of said styrene, said alphamethyl styrene or said paramethyl styrene is from about 3% to about 30% by weight, wherein said acid monomer is itaconic acid, acrylic acid, methacrylic acid, or fumaric acid, wherein the amount of said acid is from about 1.5% to about 4.0% by weight, and wherein the amount of said vinylidene chloride monomer is from about 30% to about 60% by weight.

11. A coating composition according to claim 10 wherein said amine flexibilizing agent is 2-amino-2-methyl-1-propanol.

* * * * *